(12) United States Patent
Guggenmos et al.

(10) Patent No.: US 9,061,665 B2
(45) Date of Patent: Jun. 23, 2015

(54) MAGNETIC VALVE HAVING A CORE SLEEVE AND METHOD FOR WELDING THEREOF

(75) Inventors: Harald Guggenmos, Immenstadt/Seifen (DE); Michael Dinerman, Heilbronn (DE); Andreas Wenzel, Waltenhofen-Oberdorf (DE); Dirk Foerch, Neuenstadt/Stein (DE); Manfred Schulla, Oberstdorf (DE)

(73) Assignee: Robert Bosch GmbH, Stuttgart (DE)

( * ) Notice: Subject to any disclaimer, the term of this patent is extended or adjusted under 35 U.S.C. 154(b) by 230 days.

(21) Appl. No.: 13/520,789

(22) PCT Filed: Nov. 12, 2010

(86) PCT No.: PCT/EP2010/067350
§ 371 (c)(1),
(2), (4) Date: Jul. 5, 2012

(87) PCT Pub. No.: WO2011/082869
PCT Pub. Date: Jul. 14, 2011

(65) Prior Publication Data
US 2012/0280158 A1    Nov. 8, 2012

(30) Foreign Application Priority Data
Jan. 11, 2010 (DE) .......................... 10 2010 000 771

(51) Int. Cl.
*F16K 31/06* (2006.01)
*B60T 8/36* (2006.01)
*B23K 26/28* (2014.01)

(52) U.S. Cl.
CPC ............. *B60T 8/363* (2013.01); *F16K 31/0655* (2013.01); *B23K 26/28* (2013.01); *B60T 8/3615* (2013.01); *F16K 31/0665* (2013.01)

(58) Field of Classification Search
CPC ....... B23K 26/28; F16K 31/06; F16K 31/062; F16K 31/0637; F16K 31/0644; F16K 31/0655

USPC .................................................... 251/129.15
See application file for complete search history.

(56) References Cited

U.S. PATENT DOCUMENTS

| 5,178,362 | A | * | 1/1993 | Vogt et al. ................ 251/129.21 |
| 6,142,395 | A | * | 11/2000 | Reiter ......................... 239/585.1 |
| 2007/0001142 | A1 | * | 1/2007 | Kratzer .................... 251/129.18 |
| 2009/0008587 | A1 | * | 1/2009 | Speer et al. .............. 251/129.15 |
| 2009/0283707 | A1 | | 11/2009 | Kam | |

FOREIGN PATENT DOCUMENTS

| DE | 40 30 971 A1 | 4/1992 |
| EP | 1 083 372 A1 | 3/2001 |
| JP | 60-125180 A | 7/1985 |

(Continued)

OTHER PUBLICATIONS

International Search Report corresponding to PCT Application No. PCT/EP2010/067350, mailed Jan. 24, 2011 (German and English language document) (7 pages).

*Primary Examiner* — Elizabeth Houston
*Assistant Examiner* — Ian Paquette
(74) *Attorney, Agent, or Firm* — Maginot, Moore & Beck LLP

(57) ABSTRACT

A magnet valve has a core sleeve in which a valve element is longitudinally movably arranged and has at least one housing sleeve overlaying the core sleeve which is connected to the core sleeve by welding from the outside. The weld is designed via a circumferential section or a plurality of circumferential sections of the housing sleeve forming at least one weld-free zone. A method for welding such a core sleeve of a magnet valve to the housing sleeve is also disclosed. The weld is made via a circumferential section or a plurality of circumferential sections of the housing sleeve, leaving at least one weld-free zone.

7 Claims, 2 Drawing Sheets

(56) References Cited

FOREIGN PATENT DOCUMENTS

| JP | 4-505954 A | 10/1992 |
| JP | 2009-195948 A | 9/2009 |
| JP | 2009-250426 A | 10/2009 |
| WO | 2007/033855 A1 | 3/2007 |

* cited by examiner

MAGNETIC VALVE HAVING A CORE SLEEVE AND METHOD FOR WELDING THEREOF

This application is a 35 U.S.C. §371 National Stage Application of PCT/EP2010/067350, filed on Nov. 12, 2010, which claims the benefit of priority to Serial No. DE 10 2010 000 771.4, filed on Jan. 11, 2010 in Germany, the disclosures of which are incorporated herein by reference in their entirety.

The disclosure relates to a solenoid valve having a core sleeve, in which a valve element is arranged so as to be longitudinally displaceable, and having at least one housing sleeve, which covers the core sleeve and is connected to the core sleeve by welding performed from the outside. The disclosure further relates to a method directed towards the welding.

BACKGROUND

Solenoid valves of the generic type are known. Solenoid valves, which comprise a core sleeve, in which a valve element is arranged so as to be longitudinally displaceable, and wherein the core sleeve is covered by a housing sleeve, are used, for example, as control valves in hydraulic devices, for example braking systems of motor vehicles. The housing sleeves are generally composed of a sheet metal, which is welded together with the, generally steel, core sleeve for the permanent connection of the two parts. This welding serves to eliminate cost-intensive fastening elements. The welding is generally performed over the outer circumference in a circumferential direction with a certain overlap of the weld seam, that is to say over a circumferential angle of >360°. For welding, the core sleeve and the housing sleeve must bear directly against one another, in order to convert the energy input into the formation of the weld seam. The housing sleeve with the core sleeve to be welded is rotated in a circumferential direction along the welding appliance, in order to produce the welding, or the welding appliance has to be moved around the solenoid valve. This calls for a high level of precision with regard to the relative arrangement of the core sleeve and the housing sleeve, and the required rotation makes the all-round welding intricate in terms of design and costly in terms of the required process time.

SUMMARY

The process time and the required process precision can be advantageously reduced. To achieve this, a solenoid valve is proposed, having a core sleeve, in which a valve element is arranged so as to be longitudinally displaceable, and having at least one housing sleeve, which covers the core sleeve and is connected to the core sleeve by welding performed from the outside. It is proposed here that the welding be formed over a circumferential portion or multiple circumferential portions of the housing sleeve, forming at least one weld-free zone. Contrary to the state of the art, therefore, the welding is not performed all round or even overlapping in a circumferential direction (over an angle of >360°), but over a circumferential portion or multiple circumferential portions of the housing sleeve. The welding is consequently not formed continuously, but with the formation of at least one weld-free zone. In particular, it is proposed here that multiple circumferential portions of the housing sleeve be welded and multiple circumferential portions be formed as weld-free zone, that is to say, for example, a weld is followed, viewed in a circumferential direction, by a weld-free zone, which is in turn followed by a weld and following this another weld-free zone. This reduces the required process time considerably. At the same time a connection is formed between the core sleeve and the housing sleeve that is just as durable for the intended purpose.

The welding preferably takes the form of laser welding, that is to say is formed in such a way that the welding is performed from the outside by means of a laser welding appliance.

In a preferred embodiment the radial gap between the core sleeve and the housing sleeve in the weld-free zone is greater than in at least one adjoining welded zone having the welding. In these embodiments it is possible to perform a reliable welding of the core sleeve and the housing sleeve, without the energy input into the housing sleeve in areas in which the radial gap between the core sleeve and the housing sleeve is more than just a minute gap giving rise to an unwanted thermal load or even impairment or destruction of the housing sleeve, due to burn-through, for example.

Such larger radial gaps are necessary, for example, when flushing of the core sleeve with a medium controlled by the solenoid valve is required, or when reductions in the diameter are required for adjustment of the shape, for the purpose of guiding the core sleeve, for example. Such a reduction in diameter, for example, may involve a mere deviation from a circular cross-sectional shape, for example in the form of a flattening, or else a pronounced groove, introduced in any direction, preferably in an axial direction. Depending on the arrangement of the enlarged radial gap, it is also possible, for example, to arrange weld-free zones and welds not at the same axial height but at a different axial height, for example, or at several axial heights, viewed over the axial extent of the housing sleeve.

A method is furthermore proposed for welding a core sleeve of a solenoid valve, in which a valve element is arranged so as to be longitudinally displaceable, to a housing sleeve of the solenoid valve covering the core sleeve, wherein the welding for connecting the core sleeve and the housing sleeve is performed from the outside. It is proposed here that the welding be performed over a circumferential portion or multiple circumferential portions of the housing sleeve, leaving at least one weld-free zone. Accordingly, the welding is not performed continuously all round the circumference, but in portions, that is in such a way that at least one circumferential portion of the housing sleeve has the welding and at least one other circumferential portion of the housing sleeve is not welded, that is to say it has a weld-free zone.

In a further preferred embodiment the welding is performed as laser welding.

Further advantageous embodiments are set forth in the dependent claims and combinations thereof.

BRIEF DESCRIPTION OF THE DRAWINGS

Features of the disclosure are explained in more detail below with reference to an exemplary embodiment, but is not limited to this.

In the drawing.

DETAILED DESCRIPTION

Figure 1:
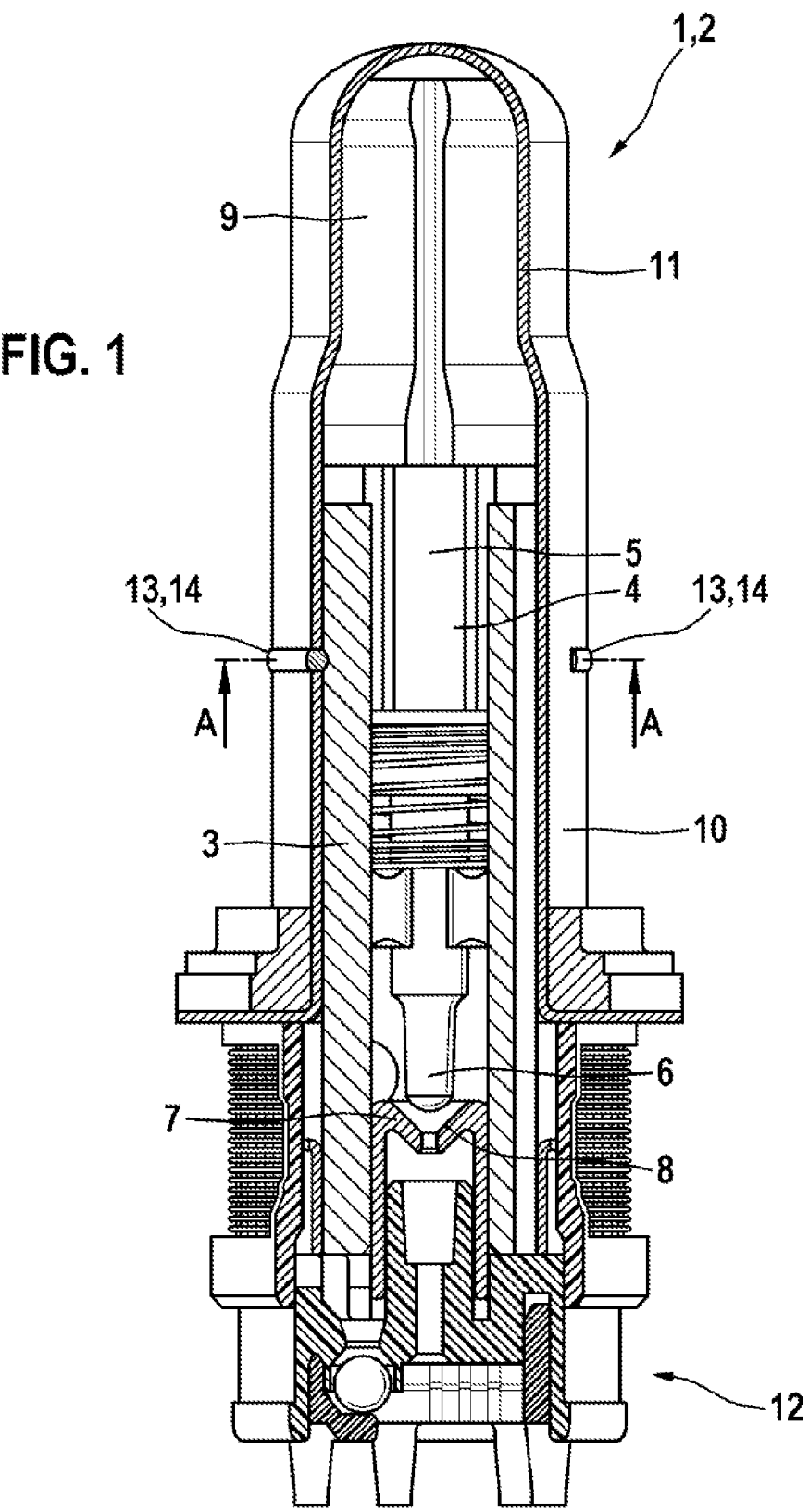
FIG. 1 shows a representation of a solenoid valve, in a partial longitudinal section

FIG. 1 shows a solenoid valve 1, that is to say a normally open, so-called inlet valve 2 without the action of flow. The solenoid valve 1 comprises a core sleeve 3, in which a valve element 4 is arranged so as to be longitudinally displaceable, and wherein the valve element 4 is embodied as a solenoid armature 5 having an end valve plunger 6, which interacts with a valve seat 8, axially centered in a radial direction in a valve body 7, for opening and closing of the solenoid valve 1. Here the solenoid armature 5 is actuated by a pole body 9, which relative to the solenoid armature 5 is arranged opposite the valve plunger 6 on the solenoid armature and at least some areas of which are covered by a bobbin (not shown) of a solenoid, and which serves for introducing magnetic force for actuation of the solenoid armature 5 and thereby the valve plunger 6, in order to release or to block a volumetric flow of a medium (not shown) in the solenoid valve 1. For external sealing the solenoid valve is enclosed by a housing 10, which in the area of the core sleeve 3 is provided by a housing sleeve 11, and in the approximate axial area of the valve plunger 6, as viewed in the axial extent, is provided housing closure 12 connected to the housing sleeve for insertion of the solenoid valve 1 into a valve block (not shown). For pressure-resistant fixing of the housing sleeve 11 on the core sleeve 3 a welding 13, which is performed as laser welding 14 from the outside after slipping the housing sleeve 11 over the core sleeve 3, is applied in the area of the section line A-A. The welding 13 serves to weld the housing sleeve 11 to the core sleeve 3 in the position shown.

Figure 2:
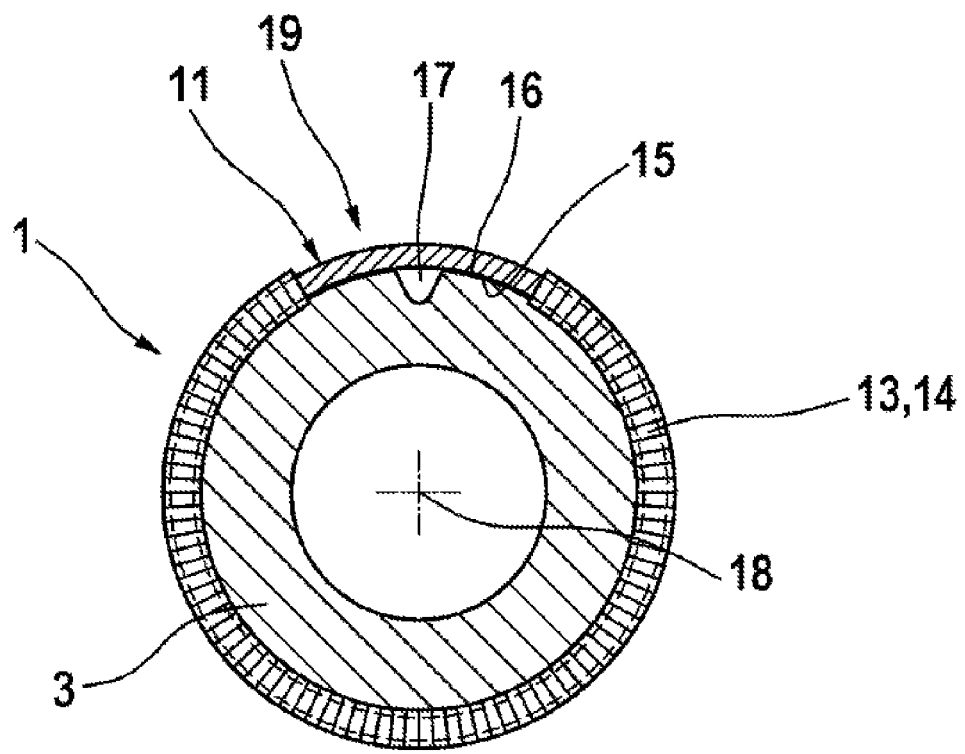
FIG. 2 shows a cross section through the solenoid valve in the area of the welding.

FIG. 2 shows the solenoid valve 1 in cross section in the area of the section line A-A represented in FIG. 1. The housing sleeve 1 encloses the core sleeve 3, a housing sleeve inside wall 15 facing a core sleeve outside wall 16 with a very small gap or preferably in a position of direct contact. Shown in the 12 o'clock position in the axial direction, a groove 17 is let into the core sleeve 3, that is to say into the core sleeve outside wall 16 pointing radially inwards towards a center 18. Between the housing sleeve 11 and the core sleeve 3, approximately in the area between the 1 o'clock position and the 11 o'clock position, the welding 13 is applied from the outside as laser welding 14, so that the core sleeve 3 and the housing sleeve 11 are welded to one another in this area. A weld-free zone 19 is formed between approximately the 11 o'clock position and the 1 o'clock position, leaving out, as it were, the area of the groove 17. In the area of the weld-free zone 19 there is no energy input to the housing sleeve 11 (the laser welding is performed from the outside through the housing sleeve 11, with a thermal action on the core sleeve 3). In this way any heat damage, in particular any burn-through, of the housing sleeve 11 in the area where the core sleeve 3 deviates from the internal geometry of the housing sleeve 11 in the area of the plane of section A-A, that is especially in the area of the groove 17, is very advantageously avoided.

The invention claimed is:

1. A solenoid valve, comprising:
    a core sleeve,
    a valve element arranged in the core sleeve so as to be longitudinally displaceable relative to the core sleeve, and
    at least one housing sleeve configured to cover the core sleeve,
    wherein the at least one housing sleeve is connected to the core sleeve by welding performed from the outside,
    wherein the welding is formed over a circumferential portion or multiple circumferential portions of the at least one housing sleeve so as to create at least one weld-free zone, and
    wherein a first radial gap defined between an outside wall of the core sleeve and an inside wall of the at least one housing sleeve in the weld-free zone is greater in radial depth than a second radial gap defined between the outside wall of the core sleeve and the inside wall of the at least one housing sleeve in at least one adjoining welded zone having the welding.

2. The solenoid valve as claimed in claim 1, wherein the welding takes the form of laser welding.

3. The solenoid valve as claimed in claim 1, wherein the first radial gap includes a groove defined in an outside wall of the core sleeve in the weld-free zone.

4. The solenoid valve as claimed in claim 1, wherein the valve element is arranged entirely within an interior of the core sleeve.

5. A method for welding a core sleeve of a solenoid valve, in which a valve element is arranged so as to be longitudinally displaceable with respect to the core sleeve, to a housing sleeve of the solenoid valve covering the core sleeve, comprising:
    welding the core sleeve and the housing sleeve together from the outside;
    wherein the welding of the core sleeve and the housing sleeve includes performing the welding over a circumferential portion or multiple circumferential portions of the housing sleeve so as to define at least one weld-free zone, and
    wherein the welding of the core sleeve and the housing sleeve is performed such that a first radial gap defined in the at least one weld-free zone between an outside wall of the core sleeve and an inside wall of the at least one housing sleeve has a greater radial depth than a second radial gap defined in an adjoining welded zone between the outside wall of the core sleeve and the inside wall of the at least one housing sleeve.

6. The method as claimed in claim 5, wherein the welding step includes laser welding the core sleeve and the housing sleeve together.

7. The method as claimed in claim 5, wherein the first radial gap includes a groove defined in an outside wall of the core sleeve in the weld-free zone.

* * * * *